United States Patent [19]

Ettes

[11] Patent Number: 5,341,085
[45] Date of Patent: Aug. 23, 1994

[54] POWER SUPPLY CIRCUIT WITH STANDBY ARRANGEMENT

[75] Inventor: Wilhelmus G. M. Ettes, Drachten, Netherlands

[73] Assignee: U.S. Philips Corporation, New York, N.Y.

[21] Appl. No.: 68,807

[22] Filed: May 27, 1993

[30] Foreign Application Priority Data

Jul. 3, 1992 [EP] European Pat. Off. ......... 92202025.0

[51] Int. Cl.⁵ .................. G05F 1/10; G05F 1/652; G05F 1/656
[52] U.S. Cl. ................................................. 323/222
[58] Field of Search ................ 323/222, 223, 282, 351

[56] References Cited

U.S. PATENT DOCUMENTS

| | | | |
|---|---|---|---|
| 4,311,954 | 9/1982 | Capel | 323/222 |
| 4,672,303 | 6/1987 | Newton | 323/222 |
| 4,970,451 | 11/1990 | Suomalainen | 323/222 |

*Primary Examiner*—Steven L. Stephan
*Assistant Examiner*—E. To
*Attorney, Agent, or Firm*—Bernard Franzblau

[57] ABSTRACT

A power supply circuit having a standby mode includes an input terminal, an output terminal and a reference terminal. A direct voltage source is connected to the input terminal and the reference terminal and a load is connected to the output terminal and the reference terminal. A series arrangement of an inductive element and a diode are connected to one another at a first node. The inductive element is connected between the input terminal and the first node and the diode is connected between the first node and the output terminal. A first electronic switch has a main current path connected between the first node and the reference terminal. A drive circuit periodically makes the main current path of the first electronic switch conductive and non-conductive. The drive circuit comprises a first switching device for making the main current path of the first electronic switch permanently non-conductive in response to a standby signal (SBS). A second electronic switch has a control electrode and a first and a second main electrode which constitute a main current path connected in parallel with the diode. A second switching device makes the main current path of the second electronic switch permanently conductive in response to the standby signal. In the standby mode the second electronic switch short-circuits the diode whereby more voltage is available at the output terminal.

23 Claims, 3 Drawing Sheets 5,341,085

POWER SUPPLY CIRCUIT WITH STANDBY ARRANGEMENT

BACKGROUND OF THE INVENTION

This invention relates to a power supply circuit comprising an input terminal, an output terminal and a reference terminal. A direct voltage source is connected to the input terminal and the reference terminal and a load is connected to the output terminal and the reference terminal. A series arrangement of an inductive element and a diode are connected to one another at a first node, the inductive element being connected between the input terminal and the first node and the diode being connected between the first node and the output terminal. A first electronic switch has a main current path connected between the first node and the reference terminal and a drive circuit periodically makes the main current path of the first electronic switch conductive and non-conductive.

The invention also relates to an electrical apparatus comprising such a power supply circuit.

Such a power supply circuit is known from U.S. Pat. No. 4,970,451. The known power supply circuit is of a configuration referred to in the literature as a "boost converter". Across the load an output voltage can be generated which is higher than the voltage from the direct voltage source. Converters of this type are used inter alia, in battery-powered apparatuses in order to boost the comparatively low battery voltage to the operating voltage of the electronic circuitry of the apparatus. The aim is then to enable operation with a minimal number of batteries in series and hence with a battery voltage which is as low as possible. Many battery-powered apparatuses have a so-called standby mode, which is necessary in order to prevent certain measurement data from being lost. For example microprocessors, random access memories and the like are thus maintained at a minimum operating voltage which is high enough to preclude the loss of information.

SUMMARY OF THE INVENTION

It is an object of the invention to provide a boost converter which enables the load to be connected to the direct voltage source in the standby mode without mechanical switches and with a minimal voltage loss.

To achieve this, in accordance with the invention, a power supply circuit of the type defined in the opening paragraph is characterized in that the drive circuit comprises a first switching device for making the main current path of the first electronic switch permanently non-conductive in response to a standby signal, and the power supply circuit further comprises a second electronic switch having a control electrode, and a first and a second main electrode which constitute a main current path connected in parallel with at least the diode of the series arrangement of the inductive element and the diode, and a second switching device for making the main current path of the second electronic switch permanently conductive in response to the standby signal.

The first switching device turns off the converter and the second electronic switch short-circuits the output terminal to the input terminal. This reduces the voltage loss across the inductive element and the diode. In particular the voltage loss across the diode is comparatively high if the direct voltage source comprises one or two batteries arranged in series.

The second electronic switch itself also produces a voltage loss. In order to minimize this loss a first embodiment of a power supply circuit in accordance with the invention is characterized in that the second electronic switch is a MOSFET transistor having a source, a drain and a gate formed in a semiconductor body and respectively corresponding to the first main electrode, the second main electrode and the control electrode of the second electronic switch.

The low drain-source resistance of a conductive MOSFET transistor connects the load to the direct voltage source virtually without any voltage loss, as opposed to a bipolar transistor which always carries a saturation voltage. An additional advantage of a MOSFET transistor in comparison to a bipolar transistor is that hardly any current is needed to drive the control electrode of the MOSFET transistor so that the direct voltage source is not loaded unnecessarily in the standby mode.

A second embodiment of the invention, which attractively simplifies the power supply circuit, is characterized in that the main current path of the second electronic switch is connected between the first node and the output terminal, and the diode is formed by a parasitic body-to-drain diode of the MOSFET transistor.

The parasitic body-to-drain diode of the MOSFET transistor now also functions as the converter diode. This makes it possible to dispense with.

A third embodiment of a power supply circuit in accordance with the invention is characterized in that the power supply circuit further comprises: an auxiliary voltage terminal and a voltage doubler comprising a bootstrap capacitor, a smoothing capacitor, and a first and a second rectifier diode, the bootstrap capacitor being connected between a tap of the inductive element and a node, the first rectifier diode being connected between the output terminal and the node, the second rectifier diode being connected between the node and the auxiliary voltage terminal, and the smoothing capacitor being connected between the auxiliary voltage terminal and the reference terminal.

When the first electronic switch is operative this enables an auxiliary voltage to be generated which is twice as high as the voltage on the output terminal. The bootstrap capacitor is connected to the first node or to a tap of the inductive element.

BRIEF DESCRIPTION OF THE DRAWING

These and other aspects of the invention will now be described and clarified with reference to the accompanying drawings, in which.

In these Figures parts having the same function or purpose bear the same references.

DESCRIPTION OF THE PREFERRED EMBODIMENTS

Figure 1:
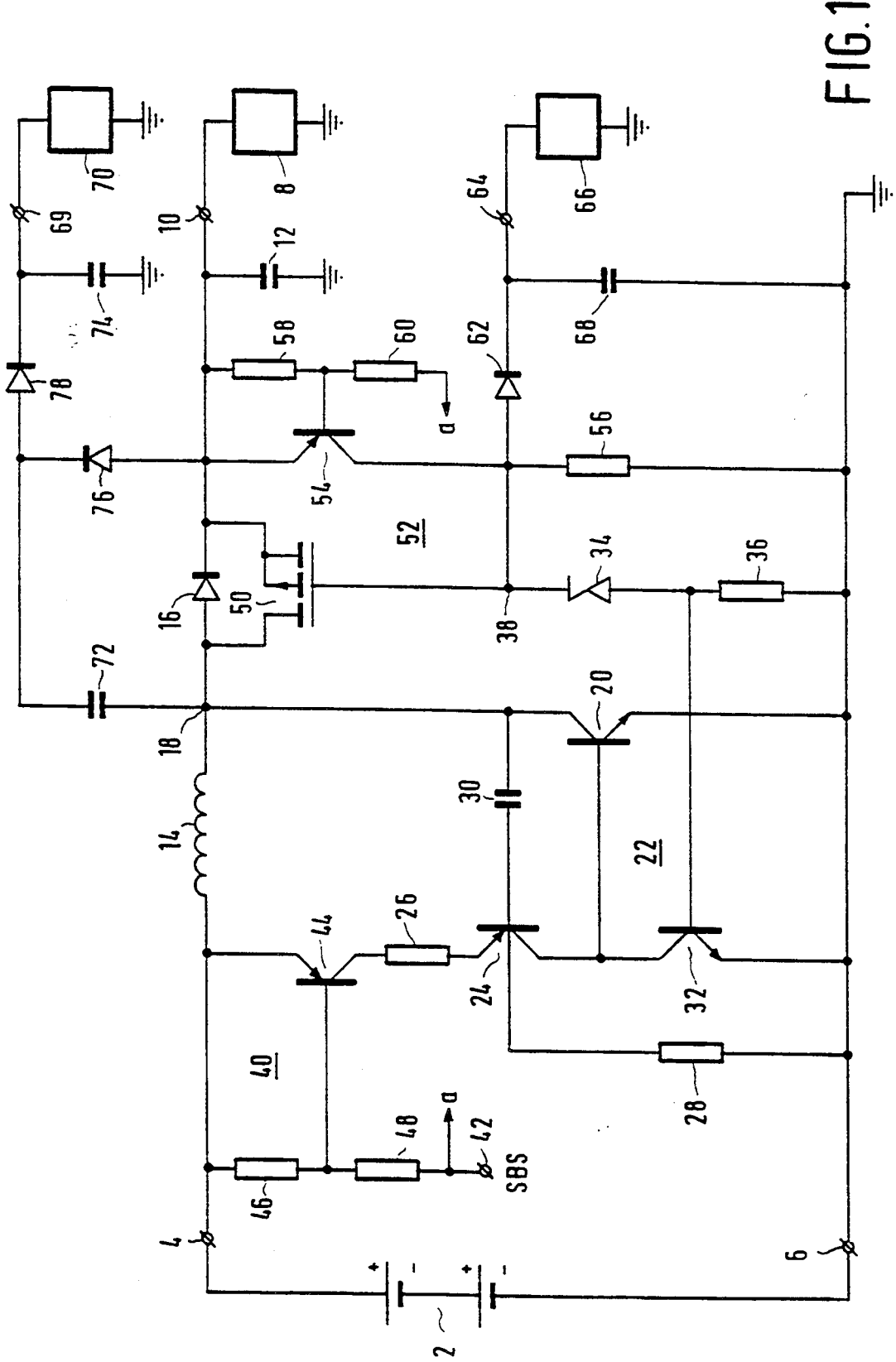
FIG. 1 shows a first embodiment of a power supply circuit in accordance with the invention.

FIG. 1 shows an embodiment of a power supply circuit in accordance with the invention. A direct voltage source 2 has its positive pole connected to an input terminal 4 and its negative pole to a reference terminal 6 which is assumed to be grounded. By way of example the direct voltage source 2 is shown as a direct voltage battery but any other direct voltage source, such as an alternating voltage source with a rectifier, may be used. A load 8 is connected across an output terminal 10 and ground. A smoothing capacitor 12, which is connected to the output terminal 10, suppresses ripple voltages which may be present on the output terminal 10. A series arrangement of an inductive element in the form of a coil 14 and a diode 16, which are connected to each other at a node 18, is arranged between the input terminal 4 and the output terminal 10. Moreover, the coil 14 is connected to the input terminal 4 and the diode 16 has its cathode connected to the output terminal 10.

The main current path of an electronic switch formed by an NPN transistor 20 is connected between the first node 18 and ground. The first main electrode or emitter of the NPN transistor 20 is connected to ground. The second main electrode or collector of the NPN transistor 20 is connected to the node 18. The control electrode or base of the NPN transistor 20 is driven by a drive circuit 22 which periodically supplies current to the base of the NPN transistor 20 to turn on and turn off the NPN transistor 20.

The drive circuit 22 comprises a PNP transistor 24 having its emitter coupled to the input terminal 4 via a resistor 26, having its collector connected to the base of the NPN transistor 20, and having its base connected to ground via a resistor 28 and to the collector of the NPN transistor 20 via a capacitor 30. The drive circuit 22 further comprises an NPN transistor 32 whose emitter, collector and base are respectively connected to ground, the base of the NPN transistor 20 and the node between a zener diode 34 and a resistor 36. The zener diode 34 and the resistor 36 are arranged in series between a node 38 and ground and together they constitute a reference voltage source generating a constant voltage difference between the node 38 and the base of the NPN transistor 32.

The drive circuit further comprises a switching device 40 which activates and deactivates the drive circuit 22 by means of a standby signal SBS applied to a signal terminal 42. The switching device 40 comprises a PNP transistor 44 and the resistors 46 and 48. The base of the PNP transistor 44 is connected to the input terminal 4 via the resistor 46 and to the signal terminal 42 via the resistor 48. The PNP transistor 44 has its emitter connected to the input terminal 4 and its collector to the resistor 26.

A PMOS transistor 50, which functions as an electronic switch, is arranged in parallel with the diode 16. The source, drain and gate forming respectively the first main electrode, the second main electrode and the control electrode of the PMOS transistor 50 are connected to the output terminal 10, the node 18 and the node 38, respectively. The gate of the PMOS transistor 50 is driven by a switching device 52 comprising a PNP transistor 54 and the resistors 56, 58 and 60. The resistor 56 is connected between the node 38 and ground, the resistor 58 between the output terminal 10 and the base of the PNP transistor 54, and the resistor 60 between the signal terminal 42 and the base of the PNP transistor 54. The PNP transistor 54 has its emitter connected to the output terminal 10 and its collector to the node 38.

Figure 3:
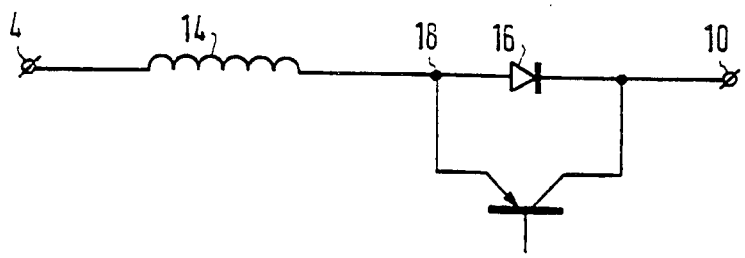
FIGS. 3, 4, 5 and 6 show variants of the embodiments shown in FIGS. 1 and 2.

The standby signal SBS can be generated in various ways. One way is, for example, by means of a switch connecting the signal terminal 42 to and disconnecting it from ground. The disconnected state then denotes the standby mode. The PNP transistors 44 and 54 then do not conduct. As a result, the drive circuit 22 is not energized and the NPN transistor 20 is off. The power supply circuit is now in a passive state. The voltage on the output terminal 10 is then approximately one diode voltage below the voltage on the input terminal 4 as a result of the voltage drop across the diode 16. The gate of the PMOS transistor 50 is connected to ground via the resistor 56, so that the main current path of the PMOS transistor 50 becomes conductive and forms a short-circuit across the diode 16. In this way it is achieved that in the standby mode the voltage across the load 8 is substantially equal to the voltage of the direct voltage source 2. This plays a significant role, particularly if the direct voltage source 2 comprises one or two battery cells, because the voltage loss across the diode 16 is then comparatively large and could give rise to a premature incorrect operation of the load in the standby mode. Examples of loads are microprocessors, random access memories and other digital and/or analog circuits which should remain operative in the standby mode in order to preclude a loss of information. It is to be noted that the switching devices 40 and 52 do not draw any current from the direct voltage source 2 in the standby mode. This is favourable when batteries are used. Instead of the PMOS transistor 50 it is possible to use a bipolar PNP transistor, as is shown in FIG. 3. However, even in the case of a small load current the saturation voltage of such a transistor causes a voltage loss between the input terminal 4 and the output terminal 10. This may be undesirable. Besides, a certain amount of base current is needed for driving a bipolar transistor, which current must be supplied by the direct voltage source 2 in the standby mode.

The power supply circuit is activated when the standby signal SBS connects the signal terminal 42 to ground. In that case the PNP transistors 44 and 54 are conductive. The PNP transistor 54 then connects the node 38 to the output terminal 10. The gate-source voltage of the PMOS transistor 50 is then substantially zero and the PMOS transistor 50 is turned off. By means of the PNP transistor 44 the emitter of the PNP transistor 24 is connected to the input terminal 4 via the resistor 26. Now a base current can flow into the PNP transistor 24 via the resistor 28 and the resulting collector current flows to the base of the NPN transistor 20, which is driven into saturation. The collector voltage of the NPN transistor 20 then exhibits a negative transient, which is transferred to the base of the PNP transistor 24 by the capacitor 30, as a result of which the PNP transistor 24 is also saturated. The resistor 26 limits the current through the PNP transistor 24. The collector current through the NPN transistor 20 also flows through the coil 14 and increases as a linear function of time. The diode 16 is then cut off. For a certain value of the collector current through the NPN transistor 20 this transistor is desaturated and the collector voltage rapidly increases in a positive sense. The capacitor 30 transfers this voltage increase to the base of the PNP transistor 24, so that this transistor and hence the NPN transistor 20 are turned off. The current through the coil now finds its way to the load 8 and the smoothing capacitor 12 through the diode 16 which is now conductive. The current through the coil 14 then decreases to zero and the collector voltage of the NPN transistor 20 decreases to the voltage on the input terminal 4. After this the capacitor 30 can discharge to ground via the resistor 28 and drive the base of the PNP transistor 24 to turn on this transistor. This cycle repeats itself. The power supply is self-oscillating (SOPS). If the voltage on the output terminal 10 and hence that on the node 38 exceeds a given value the zener diode 34 is turned on. The NPN transistor 32 is then driven into conduction and turns off the NPN transistor 20 prematurely. The peak value of the current in the coil 14 is limited to such an extent that the voltage on the output terminal 10 does not increase any further. This voltage is equal to the sum of the base-emitter voltage of the NPN transistor 32, the zener voltage of the zener diode 34 and the collector-emitter saturation voltage of the PNP transistor 54. This SOPS operates at a substantially constant frequency, which may be advantageous for the dimensioning of the coil 14.

Figure 4:
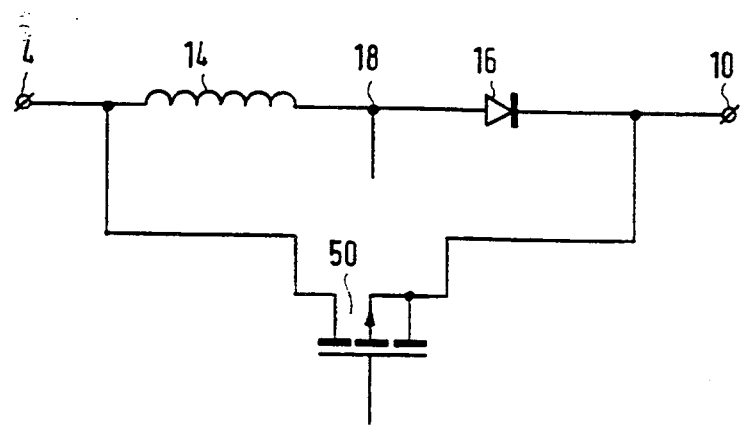

The internal body-to-drain diode of the PMOS transistor can also perform the function of the diode 16 so that a separate diode 16 is not needed in that case. If required, the PMOS transistor 50 may be arranged between the input terminal 4 and the output terminal 10, as is shown in FIG. 4, so that the coil is also bypassed in the standby mode. In that case a separate diode 16 is necessary.

Another option is that the power supply circuit may further comprise a diode 62 having its anode connected to the node 38 and its cathode to an output terminal 64 to which a load 66 can be connected. A smoothing capacitor 68 to suppresses ripple voltages on the output terminal 64. The diode 62 isolates the load 66 from the power supply circuit in the standby mode so that it cannot be energized. In this way a distinction can be made between a load 8 which is energized in the standby mode and a load 66 which is not energized in the standby mode.

Further optional parts are an auxiliary voltage terminal 69 for the connection of a load 70, a bootstrap capacitor 72, a smoothing capacitor 74, and the diodes 76 and 78, which parts are arranged to form a voltage doubler. The bootstrap capacitor 72, the cathode of the diode 76 and the anode of the diode 78 are interconnected. The other terminals of these elements are respectively connected to the node 18, the output terminal 10 and the auxiliary voltage terminal 69, to which the smoothing capacitor 74 is also connected. In the standby mode the load 70 is isolated from the power supply circuit in the same way as the load 66 by a diode, i.e. the diode 78.

Figure 5:
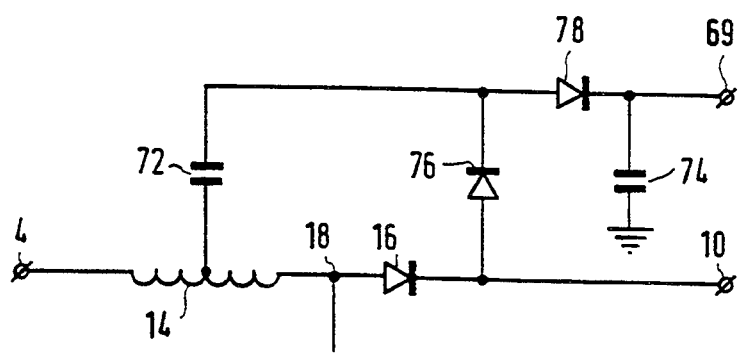
Figure 6:
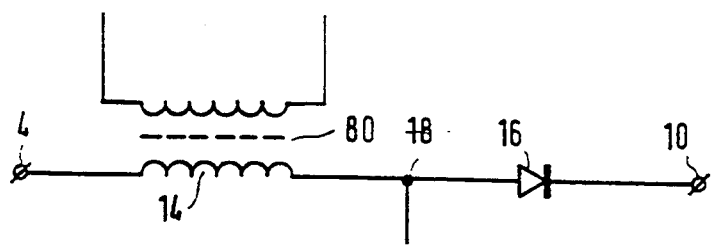

As is shown in FIG. 5, the bootstrap capacitor 72 may be connected to a tap of the coil 14. FIG. 6 shows the possibility of using a transformer 80 of which one winding forms the coil 14.

Figure 2:
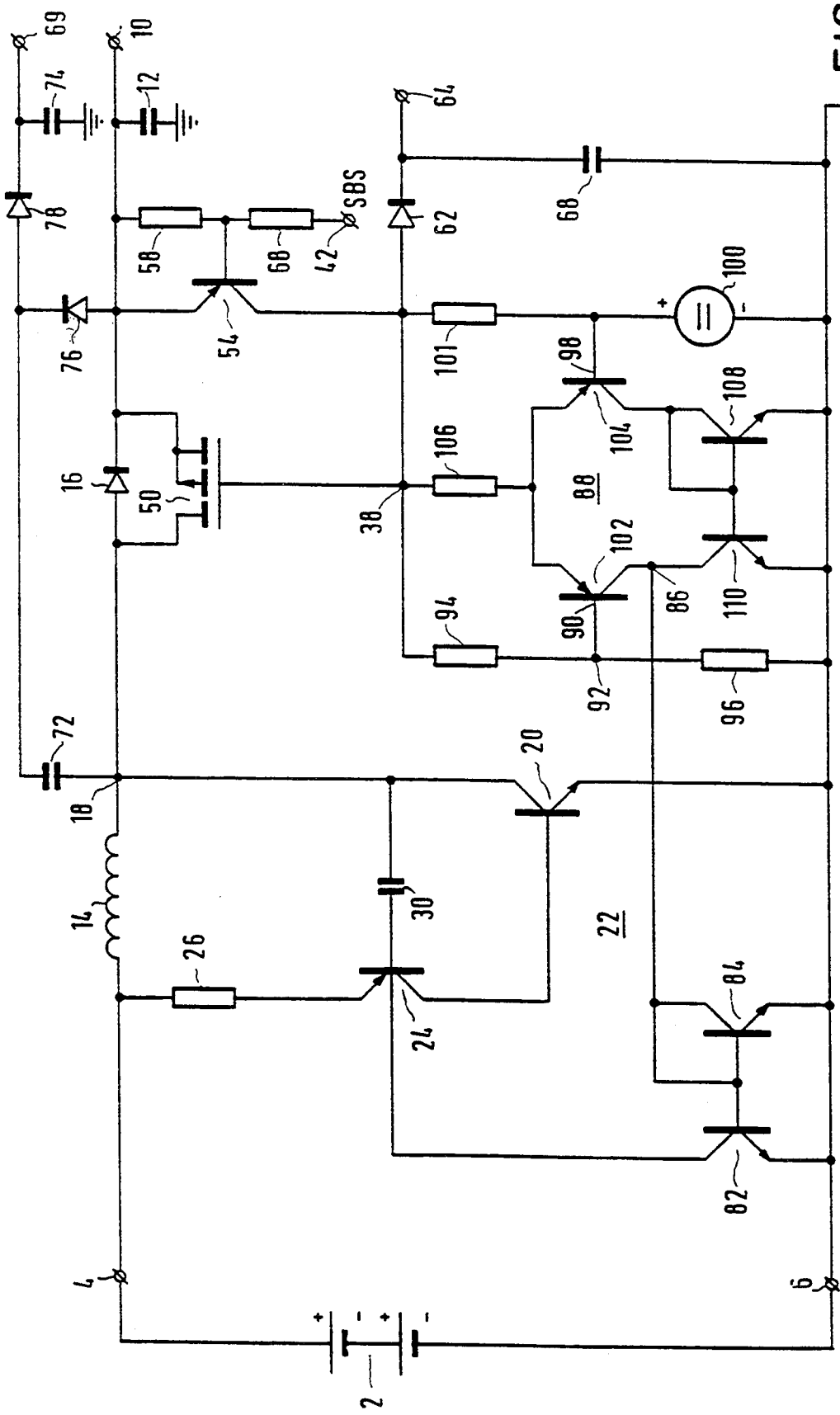
FIG. 2 shows a second embodiment of a power supply circuit in accordance with the invention.

FIG. 2 shows another embodiment of a power supply circuit in accordance with the invention. This embodiment is largely identical to that shown in FIG. 1. The resistor 26 is now connected directly to the input terminal 4. The resistor 28 is dispensed with and the NPN transistor 32 is replaced by an NPN transistor 82 whose emitter is connected to ground and its collector to the base of the PNP transistor 24. The base-emitter junction of the NPN transistor is connected in parallel with the corresponding junction of an NPN transistor 84 having its collector and its base interconnected. The two NPN transistors 82 and 84 are arranged as a current mirror whose input, which is formed by the collector of the NPN transistor 84, is connected to an output 86 of a differential amplifier 88. A first inverting input 90 of this amplifier is connected to a tap 92 of a voltage divider comprising two resistors 94 and 96 arranged in series between the node 38 and ground. The two resistors 94 and 96 also perform the function of the resistor 56 in the embodiment shown in FIG. 1. A second noninverting input 98 is connected to a reference voltage source 100, which generates a reference voltage relative to ground and which is energized from the node 38 via a resistor 101.

The differential amplifier 88 comprises a differential pair of PNP transistors 102 and 104 whose emitters are connected to the node 38 via a resistor 106. The inputs 90 and 98 are formed by the base terminals of the PNP transistors 102 and 104 respectively. The collector of the PNP transistor 104 is connected to the collector of a diode-connected NPN transistor 108 having its base-emitter junction arranged in parallel with the corresponding junction of an NPN transistor 110. The emitters of the NPN transistors 108 and 110 are connected to ground. The collectors of the PNP transistor 102 and of the NPN transistor 110 are interconnected, their node forming the output 86 of the differential amplifier 88.

In the present configuration the NPN transistor 82 functions as a variable resistor whose resistance is controlled by the differential amplifier in dependence upon the voltage difference between the tap 92 and the reference voltage from the reference voltage source 100. This causes a change of the time constant with which the capacitor 30 is charged. The switching frequency of the SOPS will decrease to counteract an increasing voltage on the node 38 and hence on the output terminal 10. In the standby mode the differential amplifier 88 is no longer powered. The NPN transistor 82 then receives no base current and is turned off, so that the PNP transistor 24 also receives no base current. The oscillation ceases. This configuration does not require a switching device comparable with the switching device 40 in the embodiment shown in FIG. 1.

The invention is not limited to the embodiments shown herein. The bipolar transistors may be replaced by their unipolar counterparts. In that case the source, drain and gate of a unipolar transistor take the place of the emitter, collector and base of a bipolar transistor.

The power supply circuit is eminently suitable for use in consumer appliances with rechargeable batteries, such as, for example, shavers having sophisticated electronic devices for measuring, monitoring and displaying the battery status and for measuring the current consumption of the motor. The measurement data should not be lost when the shaver is switched off. With the power supply circuit in accordance with the invention it is possible, even at comparatively low battery voltages to use conventional digital circuits, such as microprocessors, which otherwise could not have remained connected directly to the output terminal 10 in the standby mode on account of too low a supply voltage. In addition, the power supply circuit is also suitable for use in portable communication equipment such as radio and television receivers, telephone sets and the like and in portable computers and other digital equipment.

I claim:
1. A power supply circuit comprising: an input terminal and a reference terminal for connection of a direct voltage source to the input terminal and the reference terminal means for connection of a load to an output terminal and the reference terminal, a series arrangement of an inductive element and a diode connected to one another at a first node with the inductive element connected between the input terminal and the first node and the diode being connected between the first node and the output terminal, a first electronic switch having a main current path connected between the first node and the reference terminal, and a drive circuit for peri- odically making the main current path of the first electronic switch conductive and non-conductive, characterized in that the drive circuit comprises a first switching device for making the main current path of the first electronic switch permanently non-conductive in response to a standby signal, and a second electronic switch having a control electrode, and a first and a second main electrode which constitute a main current path connected in parallel with at least the diode of the series arrangement of the inductive element and the diode, and a second switching device for making the main current path of the second electronic switch permanently conductive in response to the standby signal.

2. A power supply circuit as claimed in claim 1, wherein the second electronic switch comprises a MOSFET transistor having a source, a drain and a gate formed in a semiconductor body and respectively corresponding to the first main electrode, the second main electrode and the control electrode of the second electronic switch.

3. A power supply circuit as claimed in claim 1, wherein the second electronic switch comprises a MOS field effect transistor and the main current path of the second electronic switch is connected between the first node and the output terminal.

4. A power supply circuit as claimed in claim 3, wherein comprises a parasitic body-to-drain diode of the MOSFET transistor.

5. A power supply circuit as claimed in claim 3 wherein the second switching device comprises: a first resistor connected to a second node between the control electrode of the second electronic switch and the reference terminal, and a switching transistor having a main current path connected between the output terminal and the second node and having a control electrode arranged to receive the standby signal.

6. A power supply circuit as claimed in claim 5, wherein the first electronic switch comprises a transistor of a first conductivity type and having a first main electrode connected to the reference terminal, a second main electrode connected to the first node, and a control electrode, wherein the drive circuit comprises: a second resistor, a second transistor of a second conductivity type opposite to the first conductivity type, a third transistor of the first conductivity type, the second and the third transistor each having a first main electrode, a second main electrode and a control electrode, the second main electrode of the second transistor and the second main electrode of the third transistor being connected to the control electrode of the first transistor, and the first main electrode of the third transistor being connected to the reference terminal, a capacitor connected between the second main electrode of the first transistor and the control electrode of the second transistor, a third resistor connected between the control electrode of the second transistor and the reference terminal, and a reference voltage source connected between the control electrode of the third transistor and the second node, and the first switching device comprises a fourth transistor of the second conductivity type having a main current path connected in series with the second resistor between the input terminal and the first main electrode of the second transistor and having a control electrode arranged to receive the standby signal.

7. A power supply circuit as claimed in claim 5, wherein the first electronic switch comprises a transistor of a first conductivity type and having a first main electrode connected to the reference terminal, a second main electrode connected to the first node, and a control electrode, the drive circuit comprises: a second resistor, a second transistor of a second conductivity type opposite to the first conductivity type, a third transistor of the first conductivity type, the second and the third transistor each having a first main electrode, a second main electrode and a control electrode, the first main electrode of the second transistor being connected to the input terminal via the second resistor, the second main electrode of the second transistor being connected to the control electrode of the first transistor, and the first main electrode of the third transistor being connected to the reference terminal, a capacitor connected between the second main electrode of the first transistor and the control electrode of the second transistor, a reference voltage source, a voltage divider connected between the second node and the reference terminal and having a tap for supplying a fraction of a voltage difference prevailing between the second node and the reference terminal, a differential amplifier having a first and a second input connected to the tap and the reference voltage source, respectively, and having an output coupled to the control electrode of the third transistor.

8. A power supply circuit as claimed in claim 7, wherein the power supply circuit further comprises: a further output terminal, and a further diode coupled between the second node and the further output terminal.

9. A power supply circuit as claimed in claim 1, wherein the power supply circuit further comprises: an auxiliary voltage terminal and a voltage doubler comprising a bootstrap capacitor, a smoothing capacitor, and a first and a second rectifier diode, the bootstrap capacitor being connected between the first node and a second node, the first rectifier diode being connected between the output terminal and the second node, the second rectifier diode being connected between the second node and the auxiliary voltage terminal, and the smoothing capacitor being connected between the auxiliary voltage terminal and the reference terminal.

10. A power supply circuit as claimed in claim 1, wherein the main current path of the second electronic switch is connected between the first node and the output terminal and said first and second switching devices are cut-off in response to the standby signal so that said switching devices draw no current from the direct voltage source.

11. A power supply circuit as claimed in claim 10 wherein the second switching device comprises: a first resistor connected to a second node between the control electrode of the second electronic switch and the reference terminal, and a switching transistor having a main current path connected between the output terminal and the second node and having a control electrode arranged to receive the standby signal.

12. A power supply circuit as claimed in claim 1, wherein the first electronic switch comprises a transistor of a first conductivity type and having a first main electrode connected to the reference terminal, a second main electrode connected to the first node, and a control electrode, wherein the drive circuit comprises: a first resistor, a second transistor of a second conductivity type opposite to the first conductivity type, a third transistor of the first conductivity type, the second and the third transistor each having a first main electrode, a second main electrode and a control electrode, the second main electrode of the second transistor and the second main electrode of the third transistor being connected to the control electrode of the first transistor, and the first main electrode of the third transistor being connected to the reference terminal, a capacitor connected between the second main electrode of the first transistor and the control electrode of the second transistor, a second resistor connected between the control electrode of the second transistor and the reference terminal, and a reference voltage source connected between the control electrode of the third transistor and a second node connected between the control electrode of the second electronic switch and the reference terminal, and the first switching device comprises a fourth transistor of the second conductivity type having a main current path connected in series with the first resistor between the input terminal and the first main electrode of the second transistor and having a control electrode arranged to receive the standby signal.

13. A power supply circuit as claimed in claim 1, wherein the first electronic switch comprises a transistor of a first conductivity type and having a first main electrode connected to the reference terminal, a second main electrode connected to the first node, and a control electrode, wherein the drive circuit comprises: a first resistor, a second transistor of a second conductivity type opposite to the first conductivity type, a third transistor of the first conductivity type, the second and the third transistor each having a first main electrode, a second main electrode and a control electrode, the first main electrode of the second transistor being connected to the input terminal via the first resistor, the second main electrode of the second transistor being connected to the control electrode of the first transistor, and the first main electrode of the third transistor being connected to the reference terminal, a capacitor connected between the second main electrode of the first transistor and the control electrode of the second transistor, a reference voltage source, a second node connected between the control electrode of the second electronic switch and the reference terminal, a voltage divider connected between the second node and the reference terminal and having a tap for supplying a fraction of a voltage difference prevailing between the second node and the reference terminal, a differential amplifier having a first and a second input connected to the tap and to the reference voltage source, respectively, and having an output coupled to the control electrode of the third transistor.

14. A power supply circuit as claimed in claim 1 wherein the second switching device comprises: a first resistor connected to a second node between the control electrode of the second electronic switch and the reference terminal, and a switching transistor having a main current path connected between the output terminal and the second node and having a control electrode arranged to receive the standby signal.

15. A power supply circuit as claimed in claim 14, wherein the power supply circuit further comprises: a further output terminal and a further diode coupled between the second node and the further output terminal.

16. A power supply circuit as claimed in claim 14, wherein the power supply circuit further comprises: an auxiliary voltage terminal and a voltage doubler comprising a bootstrap capacitor, a smoothing capacitor, and a first and a second rectifier diode, the bootstrap capacitor being connected between the first node and a third node, the first rectifier diode being connected between the output terminal and the third node, the second rectifier diode being connected between the third node and the auxiliary voltage terminal, and the smoothing capacitor being connected between the auxiliary voltage terminal and the reference terminal.

17. A power supply circuit having an operating mode and a standby mode, said power supply circuit comprising:
an input terminal and a reference terminal for connection to a source of DC voltage,
an output terminal for connection to a load,
an inductive element and a rectifier element serially connected between the input terminal and the output terminal and with a node therebetween,
a first electronic switch connected between said node and said reference terminal,
a free-running drive circuit for periodically switching the first electronic switch on and off,
a further terminal for a standby signal,
a first controlled switching device having a control electrode coupled to said further terminal and connected in circuit so as to hold the first electronic switch in cut-off so long as a standby signal is present at the further terminal,
a second electronic switch connected in parallel with at least said rectifier element, and
a second controlled switching device having a control electrode coupled to said further terminal and coupled to said second electronic switch to allow it to conduct in response to a standby signal at the further terminal and to cause it to cut-off in the absence of said standby signal at the further terminal.

18. A power supply circuit as claimed in claim 17 wherein,
said first electronic switch comprises a first transistor,
said second electronic switch comprises an MOS field effect transistor, and
said drive circuit comprises a second transistor having a control electrode coupled to a first main electrode of the first transistor via a feedback capacitor thereby to form a self-oscillating drive circuit having a constant oscillation frequency.

19. A power supply circuit as claimed .in claim 17 wherein,
said first electronic switch comprises a first transistor,
said drive circuit comprises a second transistor having a control electrode coupled to a first main electrode of the first transistor via a feedback capacitor, and
said first controlled switching device comprises a third transistor coupled between said input terminal and said second transistor.

20. A power supply circuit as claimed in claim 17 further comprising;
a resistor having a first terminal coupled to said reference terminal and a second terminal coupled to a second node located between a control electrode of the second electronic switch and the reference terminal, and wherein,
the second controlled switching device comprises a switching transistor coupled between the output terminal and the second node and with its control electrode coupled to said further terminal, and
a second output terminal and a diode coupled between the second node and the second output terminal.

21. A power supply circuit as claimed in claim 17 further comprising:
a second output terminal, and
a voltage multiplier circuit coupled between a tap on said inductive element and the second output terminal.

22. A power supply circuit as claimed in claim 17 wherein,
said second electronic switch is connected in parallel with the serial combination of the inductive element and the rectifier element,
said source of DC voltage comprises a battery, and the second electronic switch comprises an MOS field effect transistor.

23. A power supply circuit as claimed in claim 17 wherein,
said first electronic switch comprises a first transistor,
said drive circuit comprises a second transistor having a control electrode coupled to a first main electrode of the first transistor via a feedback capacitor, the power supply circuit further comprising;
means for supplying a reference voltage to the drive circuit that is independent of an output voltage at said output terminal.

* * * * *